United States Patent [19]
Chemin

[11] Patent Number: 6,005,929
[45] Date of Patent: Dec. 21, 1999

[54] METHOD OF PROVIDING SERVICES TO SUBSCRIBERS OF A TELEPHONE NETWORK

[75] Inventor: Francois Chemin, Lannion, France

[73] Assignee: France Telecom, Paris, France

[21] Appl. No.: 08/899,157

[22] Filed: Jul. 23, 1997

[30] Foreign Application Priority Data

Jul. 23, 1996 [FR] France .................................. 96 09355

[51] Int. Cl.⁶ .............................. H04M 3/54; H04M 7/00
[52] U.S. Cl. ........................... 379/211; 379/220; 379/901
[58] Field of Search .................................. 379/211, 210, 379/212, 219, 220, 233, 901

[56] References Cited

U.S. PATENT DOCUMENTS 5,018,194  5/1991  Suzuki et al. ............................ 379/207
5,737,403  4/1998  Zave ......................................... 379/211

Primary Examiner—Harry S. Hong
Attorney, Agent, or Firm—Lowe Hauptman Gopstein Gilman & Berner

[57] ABSTRACT

All calls addressed to a subscriber are forwarded by the subscriber's routing autonomy exchange to a service server connected to the exchange. If a service provided by the service server necessitates a call to the subscriber, a call from the service server is routed to a virtual subscriber terminal which is connected to the exchange. All calls which are addressed to the virtual subscriber terminal, are forwarded to the subscriber by the exchange or the virtual subscriber terminal. The service server can therefore offer the subscriber a plurality of new services.

12 Claims, 1 Drawing Sheet

METHOD OF PROVIDING SERVICES TO SUBSCRIBERS OF A TELEPHONE NETWORK

BACKGROUND OF THE INVENTION

1. Field of the Invention

The present invention concerns a method of providing services to subscribers of a telephone network, and more particularly to subscribers connected to a digital exchange.

2. Description of the Prior Art

Because of the development of switching techniques, incoming services such as call forwarding, call waiting, etc., can now be offered to subscribers of existing telephone networks. New services will be offered in the near future, for example ringback, call filtering and selective call forwarding. These services are based on CCITT No. 7 signaling and are relatively long and costly to implement. They necessitate the use of specific protocols.

OBJECTS OF THE INVENTION

It is an object of the present invention to remedy the aforementioned drawbacks.

Another object of this invention is to provide a simple method of making new and most existing services available to analog and digital subscriber terminals, applicable as of now in telephone networks without modification of the telephone exchanges.

SUMMARY OF THE INVENTION

Accordingly, a method of providing services to a subscriber of a telephone network having a first terminal connected to a first telephone exchange of said telephone network, the telephone network prohibiting calls from being forwarded twice or more times in succession, characterized in that each call to the first terminal is forwarded by the first telephone exchange to a services server connected to a second telephone exchange of the telephone network, and if a service provided by the service server necessitates a call to the first terminal, a call from the service server is routed to a second terminal connected to a third telephone exchange of the telephone network, all calls addressed to the second terminal are forwarded to the first terminal by one of the third telephone exchange and the second terminal. Typically, the second and third telephone exchanges are one and the same telephone exchange, preferably coincident with the first telephone exchange.

The method of the present invention is particularly suitable for networks with digital telephone exchanges or switches that prevent the forwarding of a call, or a terminal, twice in succession in the network. For telephone networks in which forwarding a call, or a terminal, twice in succession is prohibited, a chain of several second subscriber terminals with successive terminal forwardings is used.

A voice interface can be coupled to the service server so that the services to which the invention relates can be offered to subscriber terminals having no screen. The subscriber and the service server can therefore dialogue vocally, and the subscriber can in this way program data in a database of the service server concerned.

The second subscriber terminal may be a virtual subscriber terminal included in another server. Preferably, the second subscriber terminal is accessible by Direct Inward Dialing (DID) so that calls addressed to it reach it directly.

An unconditional forwarding service can be offered by the present invention. After each call from any calling terminal addressed to the first terminal and received by the service server, the service server can set up a call to a third terminal. A call between said any calling terminal and the service server, which corresponds to the call from said any calling terminal, can be then joined to the call between the service server and the third terminal.

This service can also be implemented for call forwarding on number change, i.e. for forwarding calls to a subscriber's new number.

According to a forwarding service on busy, after a first call from any calling terminal addressed to the first terminal and received by the service server, a second call from the service server addressed to the second terminal is forwarded by the third telephone exchange or the second terminal to the first terminal, and if the telephone line to which the first terminal is connected is busy, the service server sets up a call to a third terminal, a call between said any calling terminal and the service server corresponding to the first call being then joined to the call between the service server and the third terminal, and if the telephone line of the first terminal is not busy, a call between said any calling terminal and the service server corresponding to the first call is joined to a call between the service server and the first terminal corresponding to the second call.

A service of call forwarding on no reply can also be provided, possibly associated with a service for adjusting the ringing tone period. After a first call initiated by any calling terminal, addressed to the first terminal and received by the service server, a second call initiated by the service server and addressed to the second terminal is forwarded by the third telephone central or the second terminal to the first terminal and if the telephone line to which the first terminal is connected is not busy, in the event of response from the first terminal during a predetermined time-delay, a call between said any calling terminal and the service server corresponding to the first call is joined to a call between the service server and the first terminal corresponding to the second call, and if the first terminal does not respond during the predetermined time-delay, the service server sets up a call to a third terminal, and a call between the calling terminal and the service server corresponding to the first call is joined to the call between the service server and the third terminal.

To obtain selective call forwarding, the subscriber previously programs the telephone number of a particular calling terminal in the service server during a call to the latter from the first terminal, and after a first call initiated by the particular calling terminal, addressed to the first terminal and received by the service server, the service server sets up a call to a third terminal, a call between the particular calling terminal and the service server corresponding to the first call being then joined to the call between the service server and the third terminal, and after a second call initiated from another calling terminal, addressed to the first terminal and received by the service server, a third call initiated by the service server and addressed to the second terminal is forwarded by the third telephone exchange or the second terminal to the first terminal, and a call between the other calling terminal and the service server corresponding to the second call is joined to the call between the service server and the first terminal corresponding to the third call.

In the services mentioned above, the subscriber preferably programs the number of the third terminal beforehand into the service server during a call to the latter. The subscriber can also program the duration of the time-delay in the case of call forwarding on no reply.

The present invention can also provide a call filtering service, wherein the subscriber programs in the service server, during a call to the latter from the first terminal, the number of a particular calling terminal from which the subscriber does not wish to receive calls, and, after a first call initiated by another calling terminal, addressed to the first terminal and received by the service server, a second call initiated by the service server and addressed to the second terminal is forwarded by the third telephone exchange or the second terminal to the first terminal, a call between the other calling terminal and the service server corresponding to the first call being then joined to a call between the service server and the first terminal corresponding to the second call. The service server thus filters out calls from calling parties whose numbers are registered in a database of the service server and offers the subscriber calls from other calling parties.

In a number/name presentation service, after each call initiated by any calling party, addressed to the first terminal and received by the service server, a call initiated by the service server and addressed to the second terminal is forwarded by the third telephone exchange or the second terminal to the first terminal so as to set up a call between the service server and the first terminal to indicate to the subscriber the number and/or the name of the calling party. The subscriber can then choose to answer the call or not, or can indicate to the service server the number of another subscriber to whom the service server can forward the call, or invite the calling party, whoever it may be, to place a message in memory means known as a voice mailbox.

Furthermore, after each call initiated by any calling party, addressed to the subscriber and received by said service server, the service server, can memorize the number and/or the name of said any calling party. The number and/or name can be consulted subsequently by the subscriber during a call to the service server. The latter can offer the subscriber the facility to set up a call to said any calling party.

BRIEF DESCRIPTION OF THE DRAWING

The foregoing and other objects, features and advantages of the invention will be apparent from the reading of the following detailed description of several embodiments of the invention with reference to the corresponding accompanying drawing in which the single

DETAILED DESCRIPTION OF THE DRAWING

Figure 1:
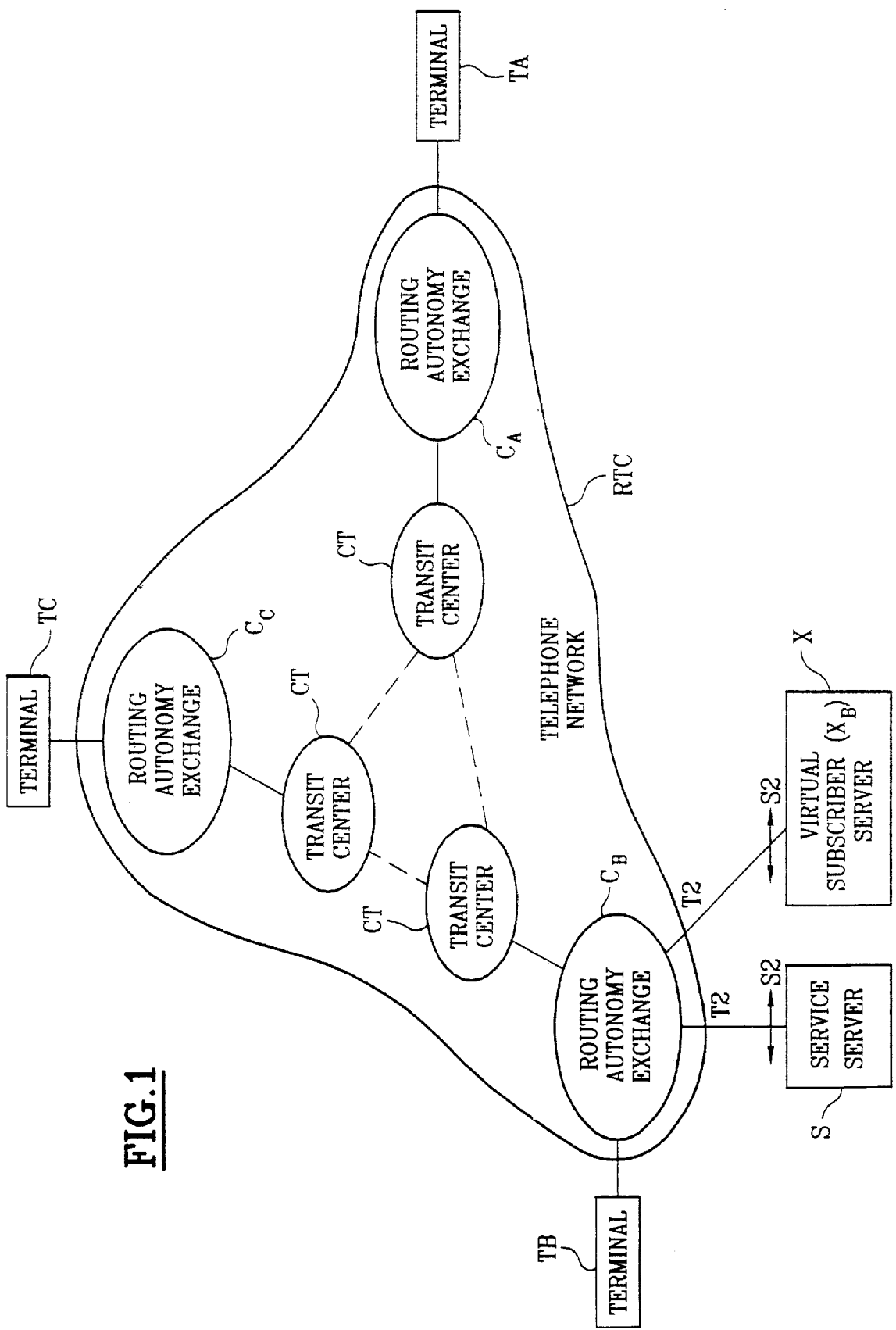
FIG. 1 is a block diagram of a system in accordance with a preferred embodiment of the invention for making services available to a telephone network subscriber.

Referring to FIG. 1, analog or digital subscriber terminals TA, TB and TC are connected to a switched telephone network RTC. The switched telephone network RTC conventionally comprises routing autonomy exchanges (RAE) $C_A$, $C_B$ and $C_C$ to which the respective subscriber terminals TA, TB and TC are connected via local office switches (not shown). The network RTC further includes transit centers CT through which the various routing autonomy exchanges (RAE), also called as subscriber connecting exchanges, are connected to each other. When the corresponding subscribers are subscribers of the Integrated Services Digital Network (ISDN), the subscriber terminals TA, TB and TC are connected to the routing autonomy exchanges at the basic access, i.e. by means of two data (B) channels each at 64 kbit/s for transmitting information between subscribers and the network and one signaling (D) channel at 16 kbit/s or 64 kbit/s for controlling calls on the B channels in accordance with the D protocol. The routing autonomy exchanges RAE are typically E10 digital switches from the French company ALCATEL or AXE10 digital switches from the French company MET. The subscriber terminals TA, TB and TC are telephone sets, for example, possibly including a screen.

In the remainder of the description, the reference symbols TA, TB and TC designate the subscriber terminals and the corresponding subscribers interchangeably.

In accordance with the invention, a service server S is connected to a second connecting exchange which, in the embodiment illustrated, is coincident with the first exchange $C_B$ to which subscriber terminal TB is connected. The connection between the server S and the routing autonomy exchange $C_B$ is at the primary access via a conventional ISDN T2 interface at 2048 kbit/s providing 30 data (B) channels and one signaling (D) channel at 64 kbit/s. The server S is a PC personal computer, for example, or a workstation, and is equipped with one or more ISDN S2 interfaces. As described below, the server S provides services to subscribers connected to its linking exchange, i.e. the exchange $C_B$, and who have subscribed to such services beforehand. These subscribers, such as subscriber TB, are subscribers of the switched telephone network RTC having an analog terminal, for example, or are subscribers of the ISDN (Integrated Services Digital Network Digital Version).

Any call from any subscriber terminal of the switched telephone network RTC, such as terminal TA, to terminal TB, is forwarded, i.e. returning by the connecting exchange $C_B$ of the terminal TB to the service server S. This terminal/call returning is a standard service offered by the ISDN.

In accordance with one aspect of the invention, a second server known as the virtual subscriber server X, the role of which is to handle calls to terminal TB, is further connected to a third connecting exchange which, in the embodiment illustrated, is coincident with the first exchange $C_B$. To transmit a call from the terminal TA to the terminal TB, the service server S must set up a call to the terminal TB. A call from the server S cannot be offered to the terminal TB because all calls to the terminal TB are returned to the server S by the exchange $C_B$. The virtual subscriber server X contains telephone numbers of virtual subscribers. These virtual subscribers are respectively associated with subscribers of the telephone network RTC such as the subscriber TB connected to the same connecting exchange $C_B$ of the service server S and having subscribed to the services to which the present invention relates and which are described below. The number of virtual subscribers is equal to or substantially less than the number of subscribers connected to the exchange $C_B$ and therefore likely to subscribe to these services, around 20,000 in practice.

Virtual subscriber server X is a PC personal computer, for example, or a workstation dedicated to the application defined above, equipped with one or more S2 interface cards and connected to the connecting exchange $C_B$ of the service server S at the primary rate by a T2 interface. Each virtual subscriber is preferably accessible in server X by direct inward dialing (DID), in other words accessible directly by means of a telephone number made up partly of the telephone number of server X and partly of a number specific to the virtual subscriber. Direct inward dialing is also a service offered by the ISDN.

Alternatively, the service server S and the virtual subscriber server X are contained in the same computer.

The first terminal TB, the subscriber of which has subscribed to the services to which the present invention relates, is therefore associated with a second subscriber terminal, called the virtual subscriber terminal $X_B$, in server X. The virtual subscriber terminal $X_B$ is further the subject of permanent terminal/call forwarding to the first subscriber terminal TB. Accordingly, when the service server S decides to set up a call to terminal TB, the server S calls the virtual subscriber terminal $X_B$ and the call is forwarded to the terminal TB by the exchange $C_B$ or the terminal $X_B$. Modern digital exchanges, in particular E10N1 switches from ALCATEL, are designed to prohibit terminals/calls from being forwarded more than once in succession in the telephone network. A telephone exchange that receives a call that has already been forwarded in the network by another exchange systematically refuses to forward the call again. Consequently, even if the terminal TB is subject to permanent call forwarding to the server S, the call from the server S terminates at the terminal TB. According to an aspect of the invention, a call is therefore set up from the service server S to the subscriber terminal TB by means of a particular feature of the telephone network terminal/call forwarding service.

In a first variant, the subscriber terminal TB is an analog terminal and has no screen. Communications between the subscriber TB and the service server S are then achieved vocally via a voice mail interface coupled to the server S. This voice interface is available off-the-shelf and is sometimes already incorporated into the S2 interface card. If necessary, dialogue between the subscriber TB and the server S is guided by vocal instruction and information messages, the subscriber terminal TB responding with voice frequency messages in the DTMF (Dual-Tone Multifrequency) code, entered via the keys of the keypad of the terminal. In a second variant, the subscriber TB dialogs with the service server S by means of a MINITEL (registered trademark) videotex terminal. In a third variant, the terminal TB is a digital terminal and has a screen enabling display of information supplied by the server. In a fourth variant, the subscriber TB dialogs with the server S which contains speech recognition functions. In a fifth variant, the subscriber TB dialogs with the server S via a digital communication network including many data sources and terminals, such as the INTERNET (registered trademark).

The various services offered, in accordance with the invention, by the server S to the subscriber TB connected to the same routing autonomy exchange $C_B$ are described below. The signaling messages mentioned hereinafter are defined in CCITT Recommendation Q-931, Fascicle VI.11.

Unconditional call forwarding: the subscriber TB requires all calls to his terminal TB to be forwarded systematically to a third subscriber terminal TC.

The subscriber TB sets up a call to the server S to transmit to it the telephone number of the third terminal TC. After each call addressed to the terminal TB from any calling terminal TA and forwarded to the server S, the server S, having recovered the numbers of the terminals TA and TB in an ISDN signaling message "SETUP", sends ringing tone to terminal TA, by transmitting a signaling message "ALERTING" to its connecting exchange $C_B$, and sets up a call to the terminal TC. To this end, the server S uses two data (B) channels, one to receive the call from terminal TA and the other for the call to the terminal TC. After receiving successive signaling messages "ALERTING" and "CONNECT" from its connecting exchange $C_B$ in accordance with the D protocol, constituting the start of the setting up of a call with the terminal TC, the server S transmits a message "CONNECT" to the exchange $C_B$ to set up a call to the terminal TA and then joins the calls TA-S and S-TC.

Joining of these calls is completed in the server S by means of an ISDN card available off-the-shelf, for example a card as manufactured by the French company VOX.

Call forwarding on busy: any call from any calling subscriber, such as the subscriber TA, to the subscriber TB is forwarded to the subscriber TC if the subscriber telephone line to which terminal TB is connected is busy.

Beforehand, the subscriber TB sets up a call to the server S to give it the telephone number of the terminal TC. After each call from the terminal TA to the terminal TB forwarded to the server S, the server S, having recovered the numbers of the terminals TA and TB in an ISDN signaling message "SETUP", sends ringing tone to terminal TA and tests the status of the telephone line by which terminal TB is connected by attempting to set up a call to the terminal TB via the associated virtual subscriber $X_B$ whose telephone number is contained in server X, as previously described. If the service server S receives in accordance with the D protocol an ISDN signaling message "DISCONNECT" with "CAUSE 17", the line of the terminal TB is busy. The server S then breaks off the setting up of the call to the terminal TB by sending a "RELEASE" message to the exchange $C_B$, calls the terminal TC and joins calls TA-S and S-TC in the same manner as above. If the line of terminal TB is not busy, server S joins a call TA-S and a call S-TB.

Call forwarding on no reply: any call from any calling subscriber, such as the subscriber TA, to the subscriber TB is forwarded to the subscriber TC if the subscriber TB does not answer.

Following a call from the terminal TA to the terminal TB forwarded to the server S, which recovers the numbers of the terminals TA and TB in a "SETUP" message, the terminal TA receives ringing tone as previously, responsive to transmitting the "ALERTING" message from the server S to its connecting exchange $C_B$. The server S then tests the line of the terminal TB as described above and, if it is busy, after breaking of f the setting up of the call to the terminal TB, the server S sends a "DISCONNECT" message with "CAUSE 171" to the exchange $C_B$ so that the terminal TA receives busy tone. If the line of the terminal TB is not busy, and after receiving an "ALERTING" message from the exchange $C_B$, the server S initiates a time-delay to wait for reception of a "CONNECT" message. If this time-delay expires before this message is received, the server achieves joining of calls TA-S and S-TC. Otherwise a call is set up between the server S and the terminal TB via the server X, and the server S sends a "CONNECT" message to the exchange $C_B$ and joins the call TA-S and the call S-TB. The value of the aforementioned time-delay can be adjusted by the subscriber TB during a call to the service server S.

Call filtering: the subscriber TB requires not to be offered calls from particular subscribers, such as the subscriber TA, whose telephone numbers have been registered by the subscriber TB in a database of the service server S, using a videotex terminal, for example.

Accordingly, after a call from the terminal TA to the terminal TB forwarded to the server S, which recovers the numbers of the terminals TA and TB in a signaling message "SETUP", the server S sends an "ALERTING" message and then a "CONNECT" message to its connecting exchange $C_B$ and sends to the terminal TA a voice message signifying "your call cannot be offered to your called party". Alternatively, the server S does not send any signaling message "CONNECT" to its exchange $C_B$, with the result that the terminal TA receives ringing tone for a predetermined time, at the end of which it receives busy tone. If the call from the terminal TA must not be filtered, the server S forwards that call to the terminal TB, by joining a call TA-S and a call S-TB as already explained.

Selective call forwarding: calls to the subscriber TB from subscribers, such as the subscriber TA, whose telephone numbers are registered in a database of the service server S are forwarded by server S to terminal TC by joining calls TA-S and S-TC. Calls from other subscribers not registered in said database are offered to subscriber TB.

Number/name Presentation: the number and the name of any calling subscriber TA are transmitted to the subscriber TB.

In a first variant, after a call from the terminal TA to the terminal TB forwarded by the server S, the latter sets up a call to the calling subscriber TA to request his name, the telephone number of the terminal TA having been transmitted already from exchange $C_A$ to the exchange $C_B$, and then to the server S in accordance with the D protocol. The server S then sets up a call to the subscriber TB via the corresponding virtual subscriber $X_B$ in the virtual subscriber server X, and transmits to the terminal TB, for example, the voice message "forename, surname or number X is calling, will you accept this call ?". The subscriber TB responds to the server S, for example by pressing keys of the keypad to generate voice frequencies in the DTMF code. If the subscriber TB accepts the call. The server S joins the call TA-S and the call S-TB. If not, the subscriber TB tells the service server S to whom the call should be forwarded, or does not respond.

Ringback: The service server S holds in memory the name and the number of the last calling parties, which are transmitted to it as previously described. The subscriber TB can therefore consult the relevant database of the server S to find out the identity of a calling party and the server S can offer to set up a call to that party.

Call forwarding on number change: if the subscriber TB has changed his number, the server S forwards all calls for the subscriber TB to the terminal designated by his new number.

In another embodiment of the present invention, applicable if an "explicit call transfer" (ECT) service is available in the ISDN network, all call joinings completed by the service server S as described hereinabove are effected directly by the digital exchange $C_B$ of the terminal TB. For example, if the server S receives a call from the terminal TA to the terminal TB and to be forwarded to the terminal TC, the server S sets up a call to the terminal TC and then a call to the terminal TA to obtain a call between three subscribers, and then withdraws from the call after exchange of protocol messages with the exchange $C_B$ which then links the communicating terminals TA and TC.

The present invention is not limited to providing services to subscribers of a single routing autonomy exchange RAE. A service server in accordance with the invention can be connected to each RAE exchange and the same server can be connected to more than one exchange.

Furthermore, as already indicated, the service server S and the virtual subscriber server X are not necessarily connected to the common exchange $C_B$, but can be connected to exchanges (switches) that are different from each other and different from the connecting exchange $C_B$ of the subscriber TB who has subscribed to the above-mentioned services. Connecting the servers S and X to a common exchange $C_B$ nevertheless reduces the routing channels taken by calls between the servers S and X and the terminal TB.

Nor is the invention limited to E10 type RAE exchanges. Any network with central offices prohibiting terminal/call forwarding twice or more times in succession is appropriate.

The exchange $C_B$ can be a private automatic branch exchange (PABX) serving a subscriber telephone installation including the terminal TB and the servers S and X.

The present invention therefore provides services that are much less costly to implement than a solution using CCITT No. 7 signaling, and above all highly flexible in their application. Voice dialog between subscribers and the service server enables these services to be offered to analog subscribers and to subscribers who do not have terminals with a screen. Furthermore, the services offered are remotely programmable by subscribers so that the latter can manage diaries, i.e. program dates and times at which they envisage using these services.

What I claim is:

1. A method of providing services to a subscriber of a telephone network having a first terminal connected to a first telephone exchange of said telephone network, said telephone network prohibiting calls from being forwarded two or more times in succession, said method including the steps of forwarding each call to said first terminal by said first telephone exchange to a services server connected to a second telephone exchange of said telephone network, and if a service provided by said service server necessitates a call to said first terminal, routing a call from said service server to a second terminal connected to a third telephone exchange of said telephone network, all calls addressed to said second terminal being forwarded to said first terminal by one of said third telephone exchange and said second terminal.

2. The method claimed in claim 1 wherein said second telephone exchange and third telephone exchange are one and the same telephone exchange.

3. The method claimed in claim 2 wherein said second telephone exchange and the third telephone exchange are coincident with said first telephone exchange.

4. The method claimed in claim 1 wherein a voice interface is coupled to said service server.

5. The method claimed in claim 1 wherein said second terminal is a virtual subscriber terminal included in a server.

6. The method as claimed in claim 1 including, after each call from any calling terminal addressed to said first terminal and received by said service server, the steps of setting up a call from said service server to a third terminal, and joining a call between said any calling terminal and said service server, which corresponds to said call from said any calling terminal, to the call between said service server and said third terminal.

7. The method as claimed in claim 1 including, after a first call from any calling terminal addressed to said first terminal and received by said service server, the steps of:

forwarding a second call, which is initiated by said service server and addressed to said second terminal, by one of said third telephone exchange and second terminal to said first terminal, and if said first terminal is busy, setting up a call from said service server to a third terminal, and joining a call between said any calling terminal and said service server, which corresponds to said first call, to the call between said service server and said third terminal, and if said first terminal is not busy, joining a call between said any calling terminal and said service server, which corresponds to said first call, to a call between said service server and said first terminal corresponding to said second call.

8. The method as claimed in claim 1 including, after a first call from any calling terminal addressed to said first terminal and received by said service server, the steps of:

forwarding a second call, which is initiated by said service server and addressed to said second terminal, by one of said third telephone exchange and second terminal to said first terminal, and if said first terminal is not busy, in the event of response from said first terminal during a predetermined time-delay, joining a call between said any calling terminal and said service server, which corresponds to said first call, to a call between said service server and said first terminal, which corresponds to said second call, and if said first terminal does not respond during said predetermined time-delay, setting up a call from said service server to a third terminal, and joining a call between said any calling terminal and said service server, which corresponds to said first call, to the call between said service server and said third terminal.

9. The method as claimed in claim 1 including the steps of:

previously programming by said subscriber a telephone number of a particular calling terminal in said service server during a call from said first terminal to said service server, and after a first call initiated by said particular calling terminal and addressed to said first terminal and received by said service server, setting up a call from said service server to a third terminal, and joining a call between said particular calling terminal and said service server, which corresponds to said first call, to the call between said service server and said third terminal, and after a second call initiated by another calling terminal and addressed to said first terminal and received by said service server, forwarding a third call, which is initiated by said service server and addressed to said second terminal by one of said third telephone exchange and second terminal, to said first terminal, and joining a call between said other calling terminal and said service server, which corresponds to said second call, to a call between said service server and said first terminal corresponding to said third call.

10. The method as claimed in claim 1 including the steps of:

programming by said subscriber in said service server, during a call to said service server from said first terminal, a telephone number of a particular calling terminal from which said subscriber does not wish to receive calls, and after a first call initiated by another calling terminal and addressed to said first terminal and received by said service server, forwarding a second call, which is initiated by said service server and addressed to said second terminal, by one of said third telephone exchange and second terminal to said first terminal, and joining a call between said another calling terminal and said service server, which corresponds to said first call, to a call between said service server and said first terminal corresponding to said second call.

11. The method as claimed in claim 1 including, after each call initiated by any calling party and addressed to said first terminal and received by said service server, the steps of forwarding a call, which is initiated by said service server and addressed to said second terminal by one of said third telephone exchange and second terminal, to said first terminal so as to set up a call between said service server and said first terminal to indicate to said subscriber at least one of number and name of said calling party.

12. The method as claimed in claim 1 including, after each call initiated by any calling party and addressed to said subscriber and received by said service server, the step of memorizing at least one of telephone number and name of said any calling party into said service server, said at least one of number and name being consulted subsequently by said subscriber during a call to said service server.

* * * * *